F. LOTTER.
BEET TOPPER.
APPLICATION FILED SEPT. 30, 1909.

1,025,755.

Patented May 7, 1912.

3 SHEETS—SHEET 1.

Witnesses

Inventor
Franklin Lotter,
by Attorneys

F. LOTTER.
BEET TOPPER.
APPLICATION FILED SEPT. 30, 1909.

1,025,755.

Patented May 7, 1912.
3 SHEETS—SHEET 2.

Inventor
Franklin Lotter,

F. LOTTER.
BEET TOPPER.
APPLICATION FILED SEPT. 30, 1909.
1,025,755.
Patented May 7, 1912.
3 SHEETS—SHEET 3.
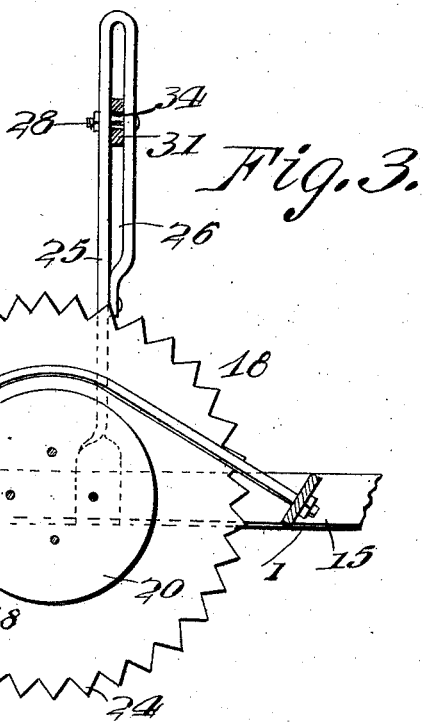
Fig. 3.
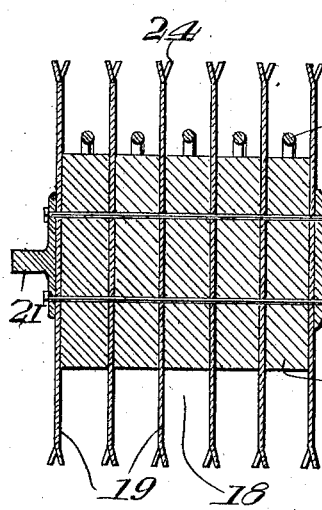
Fig. 5.
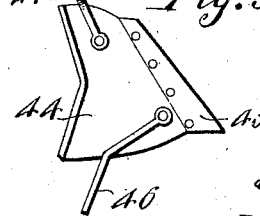
Fig. 9.
Fig. 4.
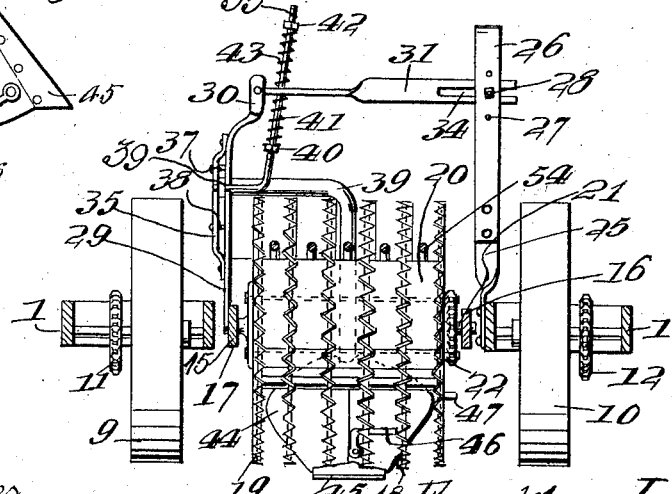
Witnesses
Inventor
Franklin Lotter,
by H. B. Willson & Co.
Attorneys

UNITED STATES PATENT OFFICE.

FRANKLIN LOTTER, OF ELKTON, MICHIGAN.

BEET-TOPPER.

1,025,755.  Specification of Letters Patent.  Patented May 7, 1912.

Application filed September 30, 1909. Serial No. 520,263.

*To all whom it may concern:*

Be it known that I, FRANKLIN LOTTER, a citizen of the United States, residing at Elkton, in the county of Huron and State of Michigan, have invented certain new and useful Improvements in Beet-Toppers; and I do declare the following to be a full, clear, and exact description of the invention, such as will enable others skilled in the art to which it appertains to make and use the same.

This invention relates to improvements in beet topping machines.

The principal object of the invention is to provide a beet topper having a wheel which will travel in the ground when either wet or dry and rise over every beet and hold it against slipping sidewise and which will also rake or brush the leaves or tops off the knife onto the mold board.

Another object of the invention is to provide a machine of this class the adjusting mechanism of which is operable only on the rising and lowering of the disk wheel and which will not adjust until the wheel has been raised an inch and a half, more or less, above the surface of the ground and which will cease to operate when said disk wheel rises above two and one-half inches.

With these and other objects in view, the invention consists of certain novel features of construction, combination and arrangement of parts as will be more fully described and particularly pointed out in the appended claims.

Figure 1:
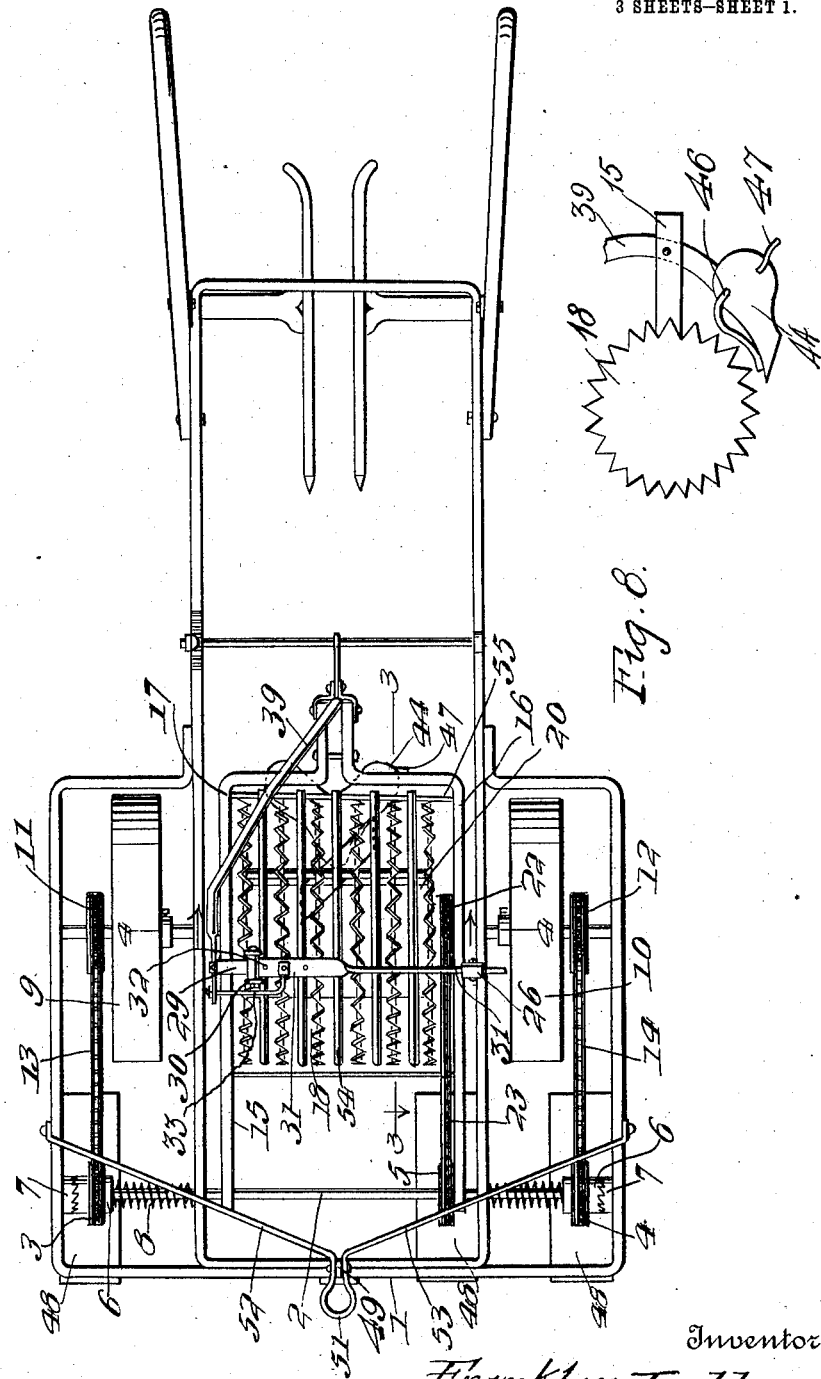
Figure 2:
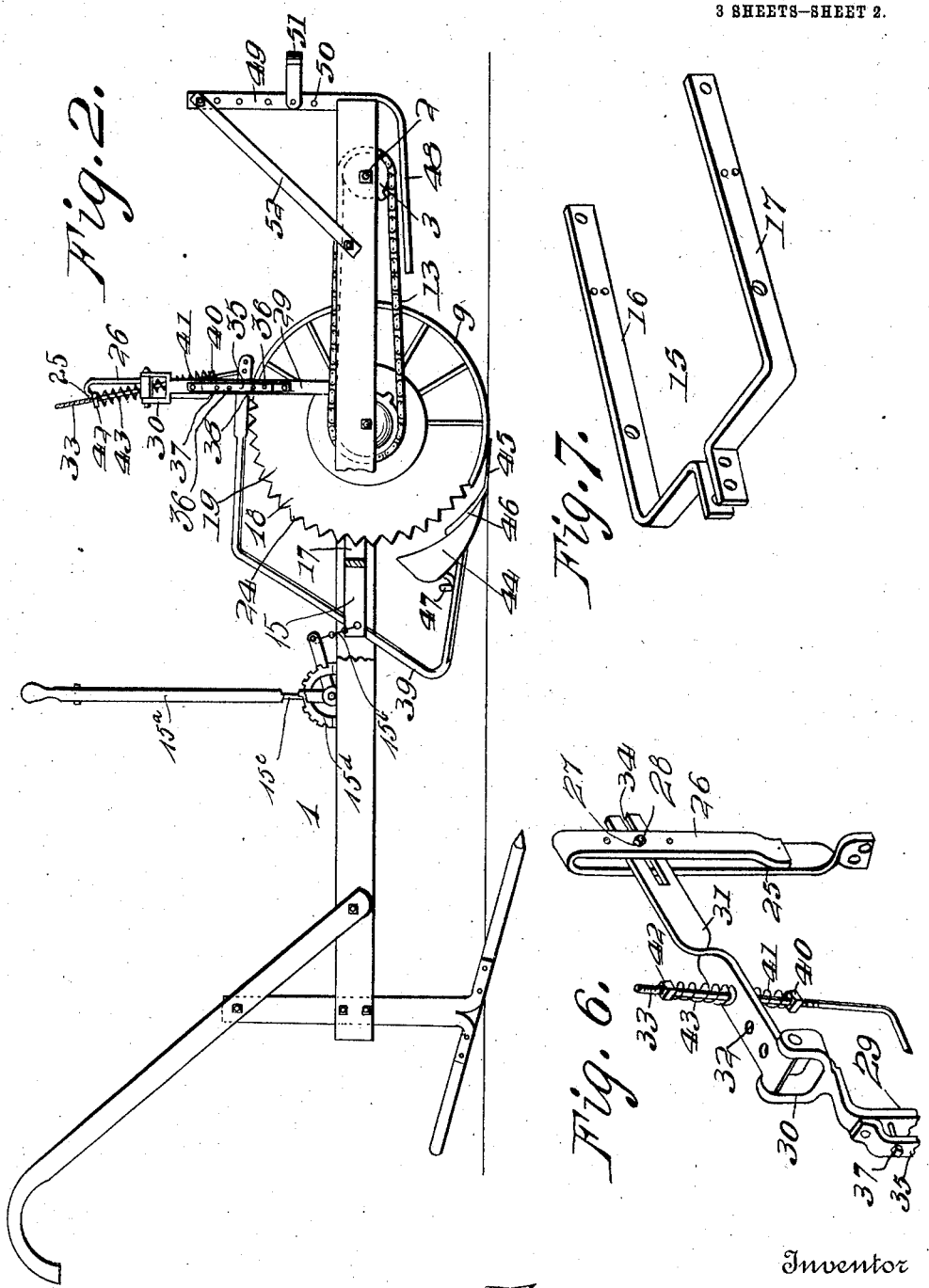

In the accompanying drawings: Figure 1 is a top plan view of this improved machine. Fig. 2 is a side elevation thereof with parts broken out. Fig. 3 is a longitudinal sectional view taken on line 3—3 of Fig. 1. Fig. 4 is a transverse section taken on the line 4—4 of Fig. 1. Fig. 5 is a vertical sectional view through the disk wheel. Fig. 6 is a detail perspective view of the adjusting lever and its connections; and Fig. 7 is a perspective view of the disk wheel supporting frame detached. Fig. 8 is a detail perspective view, showing the arrangement of the cutting knife and the members carried thereby. Fig. 9 is a detail plan view of the plow or mold board and its connected parts.

Referring to the accompanying drawings in which like numerals of reference indicate corresponding parts in all the figures, a suitable supporting frame 1, is shown, which may be formed of any suitable material such as iron, steel, or wood, and in the front end of which is mounted a shaft 2. Sprocket wheels 3 and 4, are mounted at opposite ends of the shaft 2, within the frame 1, and a similar wheel 5, is fixed to said shaft at a point intermediate of its ends. Each of the sprocket wheels 3 and 4, is provided with a clutch member, as 6, preferably arranged on the outer face thereof and which is designed to be engaged with complementary clutch members, as 7, carried by the shaft 2. Coil springs, as 8, are arranged on the shaft 2, and bear against the sprocket wheels 3 and 4, to hold the clutch members normally in operative position. Arranged at opposite sides of the frame 1, are two drive wheels 9 and 10, the axles of which are mounted in suitable bearings in said frame. Sprocket wheels 11 and 12, are fixed to the shafts of these drive wheels preferably outside the wheels 9 and 10, and are designed to receive sprocket chains 13 and 14, which also pass over the sprocket wheels 3 and 4 on the shaft 2, for driving said shaft when the drive wheels revolve.

A frame 15, is pivotally mounted at one end on the shaft 2, and is preferably constructed of substantially U-shaped form, as shown, in detail in Fig. 7, the cross bar thereof having a rearwardly extending clevis for connection with the knife beam to be described. Mounted in the frame 15, between the side members 16 and 17 thereof, is a disk wheel 18, composed of any suitable or desired number of toothed disks, as 19, which are preferably of the same diameter as the drive wheels 9 and 10, and between which are arranged spacing disks, as 20, preferably composed of a board one and one-quarter inches thick and of about nine inches in diameter, whereby the peripheries of said wooden disks are spaced a suitable distance from the toothed peripheries of the disks 19, to provide for said toothed disks entering the ground a predetermined depth. These disks 19 and 20 are preferably secured together by bolts or in any other suitable manner and are fixed to stub shafts or axles 21, which are mounted in the hinged or pivoted frame 15, to provide for the operation of the disk wheel independently of the driving wheels. A sprocket wheel 22, is fixed to one end of the shaft or axle 21, and is designed to receive a sprocket chain 23, which also passes over the sprocket wheel 5, fixed to the shaft 2, and by means of which the disk wheel is driven by the drive wheels 9 and 10. The teeth 24, of the disks 19, are constructed in a manner similar to the teeth of a circular saw before said teeth have been filed, said teeth being arranged at an angle to engage the beet tops or leaves and rake or brush them over the mold board, as will be hereinafter described. It will be observed that any desired number of disks may be employed in the construction of this wheel 18, six toothed disks being here shown with five wooden disks arranged between them.

An upright post 25, is secured at one end to the main frame 1, and the upper end thereof is preferably made in the form of a loop 26, the members of which are provided with longitudinally spaced apertures, as 27, for receiving an adjusting bolt 28, for a purpose soon to be described. A post 29, is fixed at one end to one of the side members of the frame 15, at a point opposite the post 25 and the upper end of this post 29, is offset and bifurcated, as shown at 30. An adjusting lever 31, is pivotally mounted at one end between the forks of the bifurcated end of the post 29, and is preferably composed of a metal bar, provided at its hinged end with a plurality of longitudinally spaced apertures, as 32, to receive a rod 33, hereinafter described. This bar 31, is twisted intermediately of its ends to arrange the free end thereof in edgewise position, and this end is provided with a longitudinally extending open slot, as 34, which is designed to engage the bolt 28, between the sides of the loop 26, as is shown clearly in the drawings. A keeper 35, is arranged on the outer face of the post 29, and is provided with a plurality of longitudinally spaced apertures as 36, which register with similar apertures formed in the post 29, and which are designed to receive pins 37 and 38, which limit the upward and downward movement of a knife beam 39, which is secured intermediately of its ends to the frame 15. One end of this beam 39, extends between the keeper 35, and the post 29, and is connected at its free end to the lower end of the rod 33. This rod 33, which is preferably L-shaped, is provided at its upper free end with screw threads, said screw threaded end being passed through one of the apertures, as 32, formed in the adjusting lever 31. A bur 40, is arranged on the rod 33, below the lever 31, and a coil spring 41, is mounted on said rod between the bur 40, and the lower face of the lever 31, said bur being adjustable to vary the tension of said spring 41. Another bur 42, is engaged with the screw threaded upper end of the rod 33, above the lever 31, and a coil spring 43, is arranged on said rod between the upper face of the lever 31, and the bur 42, said bur being operable to vary the tension of the spring 43. The tension of the springs 41 and 43 is adjusted to normally hold the free end of the upper arm of the knife beam in engagement with the pin 37 in which position the knife 45 is properly disposed to top ordinary sized beets. This knife beam 39, is preferably made approximately U-shaped in form with the free end of one arm extending under the disk wheel 18, and on which a mold board 44, and a knife 45, are secured. This knife 45, is arranged preferably at a horizontal angle of 45° to the moldboard and the front edge thereof is normal to the line of advance. The mold board 44, is provided with a rod 46, bolted to the lower end thereof and which extends close to the outer disk 19 of the wheel 18 and the disk teeth lift the outer ends of the leaves and cause them to fall on and over the moldboard. A similar rod 47, is arranged on the lower edge of the mold board to prevent the leaves from falling off the board too soon.

Shoes or guards, as 48, are arranged at the front end of the main frame 1, and extend under the chains which pass over the sprocket wheels 3, 4 and 5, and serve as a protection therefor to prevent clogging by leaves or dirt.

An upright bar 49, is secured to one end of the frame 1, and is provided with a plurality of longitudinally spaced apertures, as 50, designed to receive a bolt for securing a clevis 51, at any desired position thereon. Brace bars 52 and 53, are secured at one end to the upper end of the bar 49, and at their opposite ends to the side members of the supporting frame 1, whereby this clevis supporting bar 49, is held rigidly in operative position.

It will be understood that the drive wheels 9 and 10, may be spaced any suitable distance apart to adapt them for use with rows of varying widths and the wooden disks 20, may be used of varying thicknesses to adapt the toothed disk wheel 18, for use in topping beets or chickory as may be desired, thinner plates being used for chickory than for beets.

A plurality of rods, as 54, extend through the front end of the frame 15, and pass rearwardly between the toothed disks with their free ends resting on a bar or plate 55, secured to the rear end of the frame 15. These rods are designed to serve as cleaners for the disk wheel to prevent leaves and dirt from clogging between the respective disks.

The disk wheel above described is especially adapted for use with beets, all of which do not grow above the surface of the ground, some of them having the tops thereof embedded from two to two and one-half inches below the surface and without some such means it is impossible to reach the top of these submerged beets. The disks of this wheel 18, will cut through the ground and reach the tops of the beets and the knife which always travels one inch below the wheel until moved by the adjusting lever 31, will cut the tops and the disks being spaced about an inch and a half apart will hold the beets against sidewise slipping. This wheel is also especially applicable for operating when the tops of the beets are wet which is a very important feature.

In the operation of this machine, the post 25, being secured to the main frame 1, and engaged with the free end of the adjusting lever 31, holds said end in position and prevents it from rising or lowering when the disk wheel 18, moves over a large beet. The frame 15 and the members carried thereby move upwardly when the wheel 18 passes over a beet and when the frame 15 moves upward one inch more or less the knife beam 39 does not move downward from the pin 37 as the slot 34 in the lever 31 is about one and one half inches wide, more or less, and the lower wall of said slot is out of contact with the pin 28 and consequently no adjustment of the knife 45 takes place during a one inch upward movement of the frame 15 and it is not desired that the adjustment of said knife be changed until the disk wheel 18 passes over a large beet. When said wheel 18 does pass over a beet larger than the ordinary and thereby raises the frame 15 upward two or three inches, the lower wall of the slot 34 in the lever 31 is caused to engage the pin 28 and hold said lever against further upward movement as the post 25 on which said pin is secured is fastened to the main frame. The upper arm of the beam 39 bears against the pin 37 near the free end of said arm and the continued upward movement of the frame 15 and the knife beam 39 carried thereby in view of the differential between the free end of said frame and the portion to which the standard 29 is secured causes the free end of said upper beam arm and the rod 33 secured thereto to move downward and thereby compresses the coiled spring 43 on said rod. This downward movement of the free end of the upper beam arm causes the knife 45 at the other end of said beam to also move downwardly into position to cut off the top of a large beet. After the wheel 18 has passed over the large beet which causes the above described actuation of the frame 15, the frame 15 drops and the spring 43 expands and forces the beam 39 into normal position ready for operation on beets of ordinary size. When the machine passes over a beet which is growing in a furrow the frame 15 moves downwardly and the tension of the springs 41 and 43 hold the knife beam 39 in engagement with the pin 37 and thus prevents any change in the adjustment of the knife. It will thus be obvious that the top of every beet is measured by this wheel and the beets are topped as uniformly and efficiently as if performed by hand.

A bell crank lever 15$^a$ is mounted on the main frame and its short arm is connected by a flexible element 15$^b$ with the frame 15 for raising it out of engagement with the ground when desired, said lever having a spring pressed dog 15$^c$ for engagement with a notched segment 15$^d$ for locking said lever and the frame 15 at the desired height.

From the foregoing description taken in connection with the accompanying drawings, the construction and operation of the invention will be readily understood without requiring a more extended explanation.

Various changes in the form, proportion and the minor details of construction may be resorted to without departing from the principle or sacrificing any of the advantages of this invention as defined in the appended claims.

I claim as my invention:

1. In a beet harvester, a wheeled supporting frame, a shaft arranged transversely therein, a substantially U-shaped frame having its free ends pivotally connected with said shaft, a disk measuring wheel revolubly mounted between the side members of said U-shaped frame, top cutting mechanism, and means connecting said cutting mechanism with said swinging U-shaped frame and operable to vary the cutting depth of said cutting mechanism.

2. In a beet harvester, a wheeled supporting frame, a U-shaped vertically swinging frame having the free ends of the legs thereof pivotally connected with the front end of said supporting frame and arranged horizontally therein, the legs of said U-shaped frame being arranged in the same horizontal plane, a measuring wheel arranged between said legs and revolubly mounted therein, top cutting mechanism, means connecting said top cutting mechanism with said swinging frame and operable to vary the cutting depth of said cutting mechanism.

3. A beet topper comprising a supporting frame having drive wheels, a frame pivoted to swing vertically in said supporting frame, a disk measuring wheel of substantially the same diameter as said drive wheels revolubly mounted in said pivoted frame, a topping knife carried by said swinging frame, and means operable by said disk wheel for regulating the cutting depth of said knife.

In testimony whereof I have hereunto set my hand in presence of two subscribing witnesses.

FRANKLIN LOTTER.

Witnesses:
W. L. DOYLE,
F. E. DOYLE.